US010025942B2

(12) United States Patent
Schaefer et al.

(10) Patent No.: US 10,025,942 B2
(45) Date of Patent: Jul. 17, 2018

(54) SYSTEM AND METHOD OF ESTABLISHING PERMISSION FOR MULTI-TENANCY STORAGE USING ORGANIZATION MATRICES

(71) Applicant: PTC Inc., Needham, MA (US)

(72) Inventors: John Schaefer, Ambler, PA (US); Rick Bullotta, Phoenixville, PA (US)

(73) Assignee: PTC Inc., Needham, MA (US)

( * ) Notice: Subject to any disclaimer, the term of this patent is extended or adjusted under 35 U.S.C. 154(b) by 383 days.

(21) Appl. No.: 14/222,152

(22) Filed: Mar. 21, 2014

(65) Prior Publication Data

US 2015/0269390 A1    Sep. 24, 2015

(51) Int. Cl.
*G06F 17/30* (2006.01)
*G06F 21/62* (2013.01)
*G06F 21/60* (2013.01)

(52) U.S. Cl.
CPC .... *G06F 21/6218* (2013.01); *G06F 17/30289* (2013.01); *G06F 21/604* (2013.01)

(58) Field of Classification Search
CPC .... G06F 21/6218; G06F 21/604; G06F 17/30; G06F 17/30289
USPC ....................................................... 707/781
See application file for complete search history.

(56) References Cited

U.S. PATENT DOCUMENTS

| 3,656,112 A | 4/1972 | Paull |
| 3,916,412 A | 10/1975 | Amoroso, Jr. |
| 3,983,484 A | 9/1976 | Hodama |
| 4,063,173 A | 12/1977 | Nelson et al. |
| 4,103,250 A | 7/1978 | Jackson |
| 4,134,068 A | 1/1979 | Richardson |
| 4,216,546 A | 8/1980 | Litt |
| 4,554,668 A | 11/1985 | Deman et al. |

(Continued)

FOREIGN PATENT DOCUMENTS

| EP | 0497010 A2 | 8/1992 |
| EP | 1187015 A2 | 3/2002 |

(Continued)

OTHER PUBLICATIONS

Hart Server, retrieved from 2001 internet archive of hartcomm.org http://www.hartcomm.org/server2/index.html, 13 pages (2001).

(Continued)

*Primary Examiner* — Tony Mahmoudi
*Assistant Examiner* — Michael Le
(74) *Attorney, Agent, or Firm* — Meunier Carlin & Curfman LLC

(57) ABSTRACT

A system and method of establishing permissions for multi-tenancy storage using an organization matrices is provided. The method includes a computing application for setting permissions for accessing data entries of a multi-tenant database, the data entries storing data associated with a number of computing devices where the multi-tenant database is accessible by two or more tenants and/or sub-tenants. The method includes displaying via a graphical user interface that displays the one or more tenants in a single workspace where the tenants are displayed in a hierarchical structure. The method includes receiving a permission commands to establish the permissions for a tenant and causing the permissions to be set.

21 Claims, 9 Drawing Sheets

(56) References Cited

U.S. PATENT DOCUMENTS

| | | |
|---|---|---|
| 4,601,059 A | 7/1986 | Gammenthaler |
| 4,680,582 A | 7/1987 | Mejia |
| 4,704,585 A | 11/1987 | Lind |
| 4,887,204 A | 12/1989 | Johnson et al. |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,829,003 A * | 10/1998 | Okura ............... G06F 17/30572 |
| 5,892,962 A | 4/1999 | Cloutier |
| 5,909,640 A | 6/1999 | Farrer et al. |
| 5,925,100 A | 7/1999 | Drewry et al. |
| 6,073,138 A * | 6/2000 | de l'Etraz ......... G06F 17/30572 |
| | | 705/26.1 |
| 6,169,992 B1 | 1/2001 | Beall et al. |
| 6,182,252 B1 | 1/2001 | Wong et al. |
| 6,198,480 B1 | 3/2001 | Cotugno et al. |
| 6,377,162 B1 | 4/2002 | Delestienne et al. |
| 6,430,602 B1 | 8/2002 | Kay et al. |
| 6,473,788 B1 | 10/2002 | Kim et al. |
| 6,510,350 B1 | 1/2003 | Steen, III et al. |
| 6,553,405 B1 | 4/2003 | Desrochers |
| 6,570,867 B1 | 5/2003 | Robinson et al. |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,915,330 B2 | 7/2005 | Hardy et al. |
| 6,980,558 B2 | 12/2005 | Aramoto |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 7,250,862 B2 | 7/2007 | Bornhoevd et al. |
| 7,254,601 B2 | 8/2007 | Bailer et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,512,555 B2 * | 3/2009 | Finn ...................... G06Q 20/10 |
| | | 705/35 |
| 7,529,570 B2 | 5/2009 | Shirota |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 | 1/2012 | Hansen |

(56) References Cited

U.S. PATENT DOCUMENTS

| | | | |
|---|---|---|---|
| 8,126,903 B2 | 2/2012 | Lehmann et al. | |
| 8,127,237 B2 | 2/2012 | Beringer | |
| 8,131,694 B2 | 3/2012 | Bender et al. | |
| 8,131,838 B2 | 3/2012 | Bornhoevd et al. | |
| 8,136,034 B2 | 3/2012 | Stanton et al. | |
| 8,145,468 B2 | 3/2012 | Fritzsche et al. | |
| 8,145,681 B2 | 3/2012 | Macaleer et al. | |
| 8,151,257 B2 | 4/2012 | Zachmann | |
| 8,156,117 B2 | 4/2012 | Krylov et al. | |
| 8,156,208 B2 | 4/2012 | Bornhoevd et al. | |
| 8,156,473 B2 | 4/2012 | Heidasch | |
| 8,161,075 B1 * | 4/2012 | Long | G06F 17/30566 707/793 |
| 8,183,995 B2 | 5/2012 | Wang et al. | |
| 8,190,708 B1 | 5/2012 | Short et al. | |
| 8,229,944 B2 | 7/2012 | Latzina et al. | |
| 8,230,333 B2 | 7/2012 | Decherd et al. | |
| 8,249,906 B2 | 8/2012 | Ponce de Leon | |
| 8,250,169 B2 | 8/2012 | Beringer et al. | |
| 8,254,249 B2 | 8/2012 | Wen et al. | |
| 8,261,193 B1 | 9/2012 | Alur et al. | |
| 8,271,935 B2 | 9/2012 | Lewis | |
| 8,280,009 B2 | 10/2012 | Stepanian | |
| 8,284,033 B2 | 10/2012 | Moran | |
| 8,285,807 B2 | 10/2012 | Slavin et al. | |
| 8,291,039 B2 | 10/2012 | Shedrinsky | |
| 8,291,475 B2 | 10/2012 | Jackson et al. | |
| 8,296,198 B2 | 10/2012 | Bhatt et al. | |
| 8,296,266 B2 | 10/2012 | Lehmann et al. | |
| 8,296,413 B2 | 10/2012 | Bornhoevd et al. | |
| 8,301,770 B2 | 10/2012 | van Coppenolle et al. | |
| 8,306,635 B2 | 11/2012 | Pryor | |
| 8,312,383 B2 | 11/2012 | Gilfix | |
| 8,321,790 B2 | 11/2012 | Sherrill et al. | |
| 8,321,792 B1 | 11/2012 | Alur et al. | |
| 8,331,855 B2 | 12/2012 | Williams et al. | |
| 8,346,520 B2 | 1/2013 | Lu et al. | |
| 8,359,116 B2 | 1/2013 | Manthey | |
| 8,364,300 B2 | 1/2013 | Pouyez et al. | |
| 8,370,479 B2 | 2/2013 | Hart et al. | |
| 8,370,826 B2 | 2/2013 | Johnson et al. | |
| 8,375,292 B2 | 2/2013 | Coffman et al. | |
| 8,375,362 B1 | 2/2013 | Brette et al. | |
| RE44,110 E | 3/2013 | Venigalla | |
| 8,392,116 B2 | 3/2013 | Lehmann et al. | |
| 8,392,561 B1 | 3/2013 | Dyer et al. | |
| 8,396,929 B2 | 3/2013 | Helfman et al. | |
| 8,397,056 B1 | 3/2013 | Malks et al. | |
| 8,406,119 B2 | 3/2013 | Taylor et al. | |
| 8,412,579 B2 | 4/2013 | Gonzalez | |
| 8,417,764 B2 | 4/2013 | Fletcher et al. | |
| 8,417,854 B2 | 4/2013 | Weng et al. | |
| 8,423,418 B2 | 4/2013 | Hald et al. | |
| 8,424,058 B2 | 4/2013 | Vinogradov et al. | |
| 8,433,664 B2 | 4/2013 | Ziegler et al. | |
| 8,433,815 B2 | 4/2013 | van Coppenolle et al. | |
| 8,438,132 B1 | 5/2013 | Dziuk et al. | |
| 8,442,933 B2 | 5/2013 | Baier et al. | |
| 8,442,999 B2 | 5/2013 | Gorelik et al. | |
| 8,443,069 B2 | 5/2013 | Bagepalli et al. | |
| 8,443,071 B2 | 5/2013 | Lu et al. | |
| 8,457,996 B2 | 6/2013 | Winkler et al. | |
| 8,458,189 B1 | 6/2013 | Ludwig et al. | |
| 8,458,315 B2 | 6/2013 | Miche et al. | |
| 8,458,596 B1 | 6/2013 | Malks et al. | |
| 8,458,600 B2 | 6/2013 | Dheap et al. | |
| 8,473,317 B2 | 6/2013 | Santoso et al. | |
| 8,478,861 B2 | 7/2013 | Taylor et al. | |
| 8,484,156 B2 | 7/2013 | Hancsarik et al. | |
| 8,489,527 B2 | 7/2013 | van Coppenolle et al. | |
| 8,490,047 B2 | 7/2013 | Petschnigg et al. | |
| 8,490,876 B2 | 7/2013 | Tan et al. | |
| 8,495,072 B1 | 7/2013 | Kapoor et al. | |
| 8,495,511 B2 | 7/2013 | Redpath | |
| 8,495,683 B2 | 7/2013 | van Coppenolle et al. | |
| 8,516,296 B2 | 8/2013 | Mendu | |
| 8,516,383 B2 | 8/2013 | Bryant et al. | |
| 8,521,621 B1 | 8/2013 | Hetzer et al. | |
| 8,522,217 B2 | 8/2013 | Dutta et al. | |
| 8,522,341 B2 | 8/2013 | Nochta et al. | |
| 8,532,008 B2 | 9/2013 | Das et al. | |
| 8,533,660 B2 | 9/2013 | Mehr et al. | |
| 8,538,799 B2 | 9/2013 | Haller et al. | |
| 8,543,568 B2 | 9/2013 | Wagenblatt | |
| 8,547,838 B2 | 10/2013 | Lee et al. | |
| 8,549,157 B2 | 10/2013 | Schnellbaecher | |
| 8,555,248 B2 | 10/2013 | Brunswig et al. | |
| 8,560,636 B2 | 10/2013 | Kieselbach | |
| 8,560,713 B2 | 10/2013 | Moreira Sa de Souza et al. | |
| 8,566,193 B2 | 10/2013 | Singh et al. | |
| 8,571,908 B2 | 10/2013 | Li et al. | |
| 8,572,107 B2 | 10/2013 | Fan et al. | |
| 8,577,904 B2 | 11/2013 | Marston | |
| 8,578,059 B2 | 11/2013 | Odayappan et al. | |
| 8,578,328 B2 | 11/2013 | Kamiyama et al. | |
| 8,578,330 B2 | 11/2013 | Dreiling et al. | |
| 8,584,082 B2 | 11/2013 | Baird et al. | |
| 8,588,765 B1 | 11/2013 | Harrison | |
| 8,594,023 B2 | 11/2013 | He et al. | |
| 8,635,254 B2 | 1/2014 | Harvey et al. | |
| 8,689,181 B2 | 4/2014 | Biron, III | |
| 8,752,074 B2 | 6/2014 | Hansen | |
| 8,762,497 B2 | 6/2014 | Hansen | |
| 8,769,095 B2 | 7/2014 | Hart et al. | |
| 8,788,632 B2 | 7/2014 | Taylor et al. | |
| 8,898,294 B2 | 11/2014 | Hansen | |
| 9,002,980 B2 | 4/2015 | Shedrinsky | |
| 2002/0052862 A1 | 5/2002 | Scott et al. | |
| 2002/0099454 A1 | 7/2002 | Gerrity | |
| 2002/0138596 A1 | 9/2002 | Darwin et al. | |
| 2003/0093710 A1 | 5/2003 | Hashimoto et al. | |
| 2003/0117280 A1 | 6/2003 | Prehn | |
| 2004/0027376 A1 | 2/2004 | Calder et al. | |
| 2004/0133635 A1 | 7/2004 | Spriestersbach et al. | |
| 2004/0158455 A1 | 8/2004 | Spivack et al. | |
| 2004/0158629 A1 | 8/2004 | Herbeck et al. | |
| 2004/0177124 A1 | 9/2004 | Hansen | |
| 2004/0181442 A1 * | 9/2004 | Hensel | G06Q 10/10 707/791 |
| 2004/0205638 A1 * | 10/2004 | Thomas | G06F 3/0482 715/273 |
| 2005/0015369 A1 | 1/2005 | Styles et al. | |
| 2005/0021506 A1 | 1/2005 | Sauermann et al. | |
| 2005/0027675 A1 | 2/2005 | Schmitt et al. | |
| 2005/0060186 A1 | 3/2005 | Blowers et al. | |
| 2005/0102362 A1 | 5/2005 | Price et al. | |
| 2005/0198137 A1 | 9/2005 | Pavlik et al. | |
| 2005/0213563 A1 | 9/2005 | Shaffer et al. | |
| 2005/0240427 A1 | 10/2005 | Crichlow | |
| 2005/0273346 A1 * | 12/2005 | Frost | G06Q 30/00 705/316 |
| 2005/0289154 A1 | 12/2005 | Weiss et al. | |
| 2006/0186986 A1 | 8/2006 | Ma et al. | |
| 2006/0208871 A1 | 9/2006 | Hansen | |
| 2006/0236221 A1 * | 10/2006 | McCausland | G06Q 30/02 715/201 |
| 2007/0005736 A1 | 1/2007 | Hansen et al. | |
| 2007/0016557 A1 | 1/2007 | Moore et al. | |
| 2007/0027854 A1 | 2/2007 | Rao et al. | |
| 2007/0027914 A1 | 2/2007 | Agiwal | |
| 2007/0083554 A1 * | 4/2007 | Crume | G06Q 10/06 |
| 2007/0162486 A1 | 7/2007 | Brueggemann et al. | |
| 2007/0174158 A1 | 7/2007 | Bredehoeft et al. | |
| 2007/0260593 A1 | 11/2007 | Delvat | |
| 2007/0266384 A1 | 11/2007 | Labrou et al. | |
| 2007/0300172 A1 | 12/2007 | Runge et al. | |
| 2008/0022370 A1 * | 1/2008 | Beedubail | G06F 21/6218 726/4 |
| 2008/0098085 A1 | 4/2008 | Krane et al. | |
| 2008/0172632 A1 | 7/2008 | Stambaugh | |
| 2008/0208890 A1 | 8/2008 | Milam | |
| 2008/0222599 A1 | 9/2008 | Nathan et al. | |
| 2008/0231414 A1 | 9/2008 | Canosa | |
| 2008/0244077 A1 | 10/2008 | Canosa | |

(56) References Cited

U.S. PATENT DOCUMENTS

| | | |
|---|---|---|
| 2008/0244594 A1 | 10/2008 | Chen et al. |
| 2008/0255782 A1 | 10/2008 | Bilac et al. |
| 2008/0319947 A1 | 12/2008 | Latzina et al. |
| 2009/0006391 A1 | 1/2009 | Ram |
| 2009/0150431 A1 | 6/2009 | Schmidt et al. |
| 2009/0193148 A1 | 7/2009 | Jung et al. |
| 2009/0259442 A1 | 10/2009 | Gandikota et al. |
| 2009/0265760 A1 | 10/2009 | Zhu et al. |
| 2009/0282045 A1 | 11/2009 | Hsieh et al. |
| 2009/0299990 A1 | 12/2009 | Setlur et al. |
| 2009/0300060 A1 | 12/2009 | Beringer et al. |
| 2009/0319518 A1 | 12/2009 | Koudas et al. |
| 2009/0327337 A1 | 12/2009 | Lee et al. |
| 2010/0017379 A1 | 1/2010 | Naibo et al. |
| 2010/0017419 A1 | 1/2010 | Francis et al. |
| 2010/0063959 A1 | 3/2010 | Doshi et al. |
| 2010/0064277 A1 | 3/2010 | Baird et al. |
| 2010/0077001 A1 | 3/2010 | Vogel et al. |
| 2010/0094843 A1 | 4/2010 | Cras |
| 2010/0125584 A1 | 5/2010 | Navas |
| 2010/0125826 A1 | 5/2010 | Rice et al. |
| 2010/0250440 A1 | 9/2010 | Wang et al. |
| 2010/0257242 A1 | 10/2010 | Morris |
| 2010/0286937 A1 | 11/2010 | Hedley et al. |
| 2010/0287075 A1 | 11/2010 | Herzog et al. |
| 2010/0293360 A1 | 11/2010 | Schoop et al. |
| 2011/0004622 A1* | 1/2011 | Marson ............... G06Q 10/06 707/770 |
| 2011/0078599 A1 | 3/2011 | Guertler et al. |
| 2011/0078600 A1 | 3/2011 | Guertler et al. |
| 2011/0099190 A1 | 4/2011 | Kreibe |
| 2011/0137883 A1 | 6/2011 | Lagad et al. |
| 2011/0138354 A1 | 6/2011 | Hertenstein et al. |
| 2011/0145712 A1 | 6/2011 | Pontier et al. |
| 2011/0145933 A1 | 6/2011 | Gambhir et al. |
| 2011/0153505 A1 | 6/2011 | Brunswig et al. |
| 2011/0154226 A1 | 6/2011 | Guertler et al. |
| 2011/0161409 A1 | 6/2011 | Nair et al. |
| 2011/0173203 A1 | 7/2011 | Jung et al. |
| 2011/0173220 A1 | 7/2011 | Jung et al. |
| 2011/0173264 A1 | 7/2011 | Kelly |
| 2011/0184962 A1* | 7/2011 | Palmer ............... G06Q 10/10 707/754 |
| 2011/0208788 A1 | 8/2011 | Heller et al. |
| 2011/0209069 A1 | 8/2011 | Mohler |
| 2011/0219327 A1 | 9/2011 | Middleton, Jr. et al. |
| 2011/0231592 A1 | 9/2011 | Bleier et al. |
| 2011/0276360 A1 | 11/2011 | Barth et al. |
| 2011/0307295 A1 | 12/2011 | Steiert et al. |
| 2011/0307363 A1 | 12/2011 | N et al. |
| 2011/0307405 A1 | 12/2011 | Hammer et al. |
| 2011/0320525 A1 | 12/2011 | Agarwal et al. |
| 2012/0005577 A1 | 1/2012 | Chakra et al. |
| 2012/0059856 A1 | 3/2012 | Kreibe et al. |
| 2012/0066755 A1* | 3/2012 | Peddada ............... H04L 63/102 726/8 |
| 2012/0072435 A1 | 3/2012 | Han |
| 2012/0072885 A1 | 3/2012 | Taragin et al. |
| 2012/0078959 A1 | 3/2012 | Cho et al. |
| 2012/0096429 A1 | 4/2012 | Desai et al. |
| 2012/0096521 A1* | 4/2012 | Peddada ............... G06F 21/629 726/4 |
| 2012/0131473 A1 | 5/2012 | Biron, III |
| 2012/0136649 A1 | 5/2012 | Freising et al. |
| 2012/0143970 A1 | 6/2012 | Hansen |
| 2012/0144370 A1 | 6/2012 | Kemmler et al. |
| 2012/0150859 A1 | 6/2012 | Hu |
| 2012/0158914 A1 | 6/2012 | Hansen |
| 2012/0166319 A1 | 6/2012 | Deledda et al. |
| 2012/0167006 A1 | 6/2012 | Tillert et al. |
| 2012/0173581 A1 | 7/2012 | Hartig et al. |
| 2012/0173671 A1 | 7/2012 | Callaghan et al. |
| 2012/0197488 A1 | 8/2012 | Lee et al. |
| 2012/0197852 A1 | 8/2012 | Dutta et al. |
| 2012/0197856 A1 | 8/2012 | Banka et al. |
| 2012/0197898 A1 | 8/2012 | Pandey et al. |
| 2012/0197911 A1 | 8/2012 | Banka et al. |
| 2012/0239381 A1 | 9/2012 | Heidasch |
| 2012/0239606 A1 | 9/2012 | Heidasch |
| 2012/0254825 A1 | 10/2012 | Sharma et al. |
| 2012/0259932 A1 | 10/2012 | Kang et al. |
| 2012/0284259 A1 | 11/2012 | Jehuda |
| 2012/0311501 A1 | 12/2012 | Nonez et al. |
| 2012/0311526 A1 | 12/2012 | DeAnna et al. |
| 2012/0311547 A1 | 12/2012 | DeAnna et al. |
| 2012/0324066 A1 | 12/2012 | Alam et al. |
| 2013/0002676 A1* | 1/2013 | Ziemann ............... G06T 11/20 345/440 |
| 2013/0006400 A1 | 1/2013 | Caceres et al. |
| 2013/0036137 A1 | 2/2013 | Ollis et al. |
| 2013/0054563 A1 | 2/2013 | Heidasch |
| 2013/0060791 A1 | 3/2013 | Szalwinski et al. |
| 2013/0067031 A1 | 3/2013 | Shedrinsky |
| 2013/0067302 A1 | 3/2013 | Chen et al. |
| 2013/0073969 A1 | 3/2013 | Blank et al. |
| 2013/0080898 A1 | 3/2013 | Lavian et al. |
| 2013/0110496 A1 | 5/2013 | Heidasch |
| 2013/0110861 A1 | 5/2013 | Roy et al. |
| 2013/0124505 A1 | 5/2013 | Bullotta et al. |
| 2013/0124616 A1 | 5/2013 | Bullotta et al. |
| 2013/0125053 A1 | 5/2013 | Brunswig et al. |
| 2013/0132385 A1 | 5/2013 | Bullotta et al. |
| 2013/0159063 A1* | 6/2013 | Fessler ............... G06Q 10/0631 705/7.36 |
| 2013/0166563 A1 | 6/2013 | Mueller et al. |
| 2013/0166569 A1 | 6/2013 | Navas |
| 2013/0173062 A1 | 7/2013 | Koenig-Richardson |
| 2013/0179565 A1 | 7/2013 | Hart et al. |
| 2013/0185593 A1 | 7/2013 | Taylor et al. |
| 2013/0185786 A1 | 7/2013 | Dyer et al. |
| 2013/0191767 A1 | 7/2013 | Peters et al. |
| 2013/0207980 A1 | 8/2013 | Ankisettipalli et al. |
| 2013/0211555 A1 | 8/2013 | Lawson et al. |
| 2013/0232539 A1* | 9/2013 | Polunin ............... G06Q 10/047 726/1 |
| 2013/0246475 A1* | 9/2013 | Kuruganti ......... G06F 17/30575 707/785 |
| 2013/0246897 A1 | 9/2013 | O'Donnell |
| 2013/0262641 A1 | 10/2013 | Zur et al. |
| 2013/0275344 A1 | 10/2013 | Heidasch |
| 2013/0275550 A1 | 10/2013 | Lee et al. |
| 2013/0304581 A1 | 11/2013 | Soroca et al. |
| 2014/0019432 A1 | 1/2014 | Lunenfeld |
| 2014/0053110 A1* | 2/2014 | Brown ............... G06F 3/0481 715/853 |
| 2014/0282370 A1 | 9/2014 | Schaefer et al. |
| 2014/0365426 A1* | 12/2014 | Brown ............... G06Q 10/10 707/608 |
| 2015/0326512 A1* | 11/2015 | Chiu ............... G06F 17/30864 726/7 |

FOREIGN PATENT DOCUMENTS

| | | |
|---|---|---|
| WO | WO-99/21152 A1 | 4/1999 |
| WO | WO-00/77592 A2 | 12/2000 |
| WO | WO-2008/115995 A1 | 9/2008 |
| WO | WO-2014/145084 A1 | 9/2014 |

OTHER PUBLICATIONS

Ray, Erik T., Learning XML, First Edition, 277 pages (2001).

Shi, L. et al., Understanding Text Corpora with Multiple Facets, IEEE Symposium on Visual Analytics Science and Technology (VAST), 99-106 (2010).

International Search Report, PCT/US2015/021863, 3 pages, dated Jun. 25, 2015.

Written Opinion, PCT/US2015/021863, 6 pages, dated Jun. 25, 2015.

* cited by examiner

FIG. 7

SYSTEM AND METHOD OF ESTABLISHING PERMISSION FOR MULTI-TENANCY STORAGE USING ORGANIZATION MATRICES

FIELD OF THE INVENTION

This invention relates generally to establishing multi-tenancy permissions. More particularly, in certain embodiments, the invention relates to using organization matrices to establish multi-tenancy permissions.

BACKGROUND

Multi-tenant storage generally refers to a computing principle whereby multiple entities, or tenants, occupy and share an instance of a data set running on a set of shared physical or virtual resources. The sharing of the same set of resources offers a given service-provider or owner an opportunity to reduce the operational costs in having less data to manage and less equipment, associated with the data, to maintain.

However, multi-tenant storage, particularly among non-collaborative entities, may be subject by such entities to scrutiny that often adds complexity and oversight that diminishes or exceed the value proposition in sharing the set of resources. For example, a group of companies may not wish to share a given set of resources if an inadvertent sharing of confidential information exists. The company servicing the data may be required to employ auditing services to ensure that the data is securely shared among the collaborating organizations in a secured manner. To this end, multi-tenant computing is often employed by a single owner to share information and data among subsidiaries or partners.

There exists a need for an approach which reduces the complexity in implementing a secure multi-tenant environment.

SUMMARY

In general overview, an intermediary party provides, to an owner of a multi-tenant database, a computing application to establish multi-tenancy permission to one or more tenants of the database. The computing application, for example, may include a graphical user interface to concurrently establish permissions for the multi-tenant database to one or more tenants and/or sub-tenants.

In some implementations, the data may be associated to industrial equipment, retail equipment, vending machines, transport vehicles, personal computing devices, e.g., cell-phones, tablets, and various mobile devices, power generation equipment power distribution equipment, hospital equipment and/or medical devices, computing equipment, rental car fleets, mining equipment, warehouse equipment, among others.

In some implementations, the graphical user interface displays each of the one or more tenants and the one or more sub-tenants in an organization chart. An organization chart is a diagram that shows the structure of members or participants in an organization and relationships among them. An organization chart is a diagram that shows relationships among organizations as it defines whether elements of the organizations are shared or not shared. An organization is made up of a hierarchical set of organization units.

Though organization charts may be subject to change, the inventors realized that specific types of relationships are generally fixed. One such type of relationships is that defined by contracts. Example of contracts may include service contract, purchase and sales contract, and partnership agreement contracts.

To reduce the risk of inadvertent access to data, in some implementations, particularly among non-collaborative entities, the graphical user interface may display the visibility permissions on a single workspace associated to a given device or a class of devices. The graphical user interface may display the visibility permissions as a hierarchical structure, such as an organization chart. This presentation provides additional organization relationship not readily apparent in a list. To this end, an administrator setting the permission can readily identify participants that are incorrectly assigned permission to access data of the given device.

To this end, cross-organizational collaboration defined based on asset may be employed. The collaboration may foster new business models different than traditional multi-tenancy models. Data sharing between an equipment producer and an equipment purchaser, for example, may enable a symbiotic relationship whereby the producer can receive maintenance and usage information about the equipment they sell.

For example, Company A is a manufacturer of a type of industrial equipment. Company A sells its products to ten owner-operated customers, such as "Factories 1 to 10". In a traditional scheme, each Factory owner only has access to the Factory's data, and not that of other factories. As part of an after-purchase service agreement, Company A has been contracted to provide service to the industrial equipment. In being able to provide service from a single database, Company A can analyze and provide blind-benchmark information to some or all of the ten owners. Company A further benefits in having data that it can share among its internal team that may be employed to improve the design and operation of their industrial-equipment products.

To reduce the risk of advertent sharing of confidential information, in some implementations, the computing application allows an administrator to set visibility permission to the multi-tenant database via the graphical user interface. The visibility permission may serve as a global permission for a given data set within the multi-tenant database. The visibility permission may establish whether a participant has any access to a given portion of the multi-tenant database. Subsequent to setting visibility permissions, in some implementations, administrator of the multi-tenant database may set granular levels of permission types.

In addition, cross-organizational collaboration may be defined for a class of assets. To this end, the computing application may establish permissions for multiple assets and for multiple tenants (including sub-tenants) in an organization chart. The multiple asserts may have been defined within the multi-tenant database by a set of common property definitions.

Visibility permission is a form of access control that may be extended to an organization and its members. In some implementations, if data is visible to an organizational unit, then members of the organization may also have access to the data subject to the granular security permissions. The underlying, granular security permissions allows an administrator to specific the interactions (i.e., access) that any member of an organization unit may have with a specific asset (and/or class of assets). Examples of such permission types may include read access, write access, modify access, and change permissions access. If an organization does not have visibility permission, then that data essentially does not exist to that organization or the organization members.

Granular security model can be employed to allow each company access to only the data elements, services, etc. that they are entitled to. For example, Beverage Company A leases a vending machine (VM101) to Operating Company B. Operating Company B outsources the maintenance and inventory of the vending machine to Supplier C. Operating Company B also leases the vending machines from Beverage Company D. Here, Beverage Company A maintains control of the leased vending machine under a maintenance and operation agreement with Company B.

The visibility permission of the data associated to the vending machine "VM101" may be granted to organization units of the three companies (B, C, and D) depending on their contractual relationships with the Company A. Company A, as the administrator, may have all of the levels of permissions (e.g., read, write, modify, and change), including the permission to assign visibility and granular security permissions to other organizations. To view the performance of its leased assets, Company A may grant read-permissions to Company B. To service the inventory of the vending machine, Company A may grant read and write permissions to Company C. To prevent Company D from accessing the data, Company A may not grant visibility permission to Company D.

Applications for the systems and methods described herein are not limited to the aforementioned examples, but may be deployed in any number of contexts, as would be understood by one of ordinary skill in the art. Contents of the background are not to be considered as an admission of the contents as prior art.

In one aspect, the present disclosure describes a method of establishing permissions for multi-tenancy storage using an organizational matrices. The method includes providing, by a processor of a computer, a computing application for setting permissions for accessing data entries of a multi-tenant database. The data entries store data associated with one or more computing devices where the multi-tenant database is accessible by two or more tenants. The tenants may include a first sub-tenant and a second sub-tenant where the sub-tenants are a part of the first tenant. The tenants may include a third sub-tenant and a fourth sub-tenant where these sub-tenants are a part of the second tenant. At least two of the tenants may not be part of the same organization or company.

In some implementations, the method includes displaying, via the computing application, a graphical user interface associated with the computer where the graphical user interface displays the tenants in a single workspace where the tenants are displayed with a hierarchical structure. The graphical user interface may display each of the first tenant and second tenant as an object where the object includes an graphical input to add a sub-tenant to the respective first tenant and second tenant. The graphical user interface may display each of the first tenant and second tenant as an object where the object includes an graphical input to add a sub-tenant to the respective first tenant and second tenant.

In some implementations, the method includes receiving, in the workspace at the graphical user interface of the computing application, a first permission command to establish the permissions for a first tenant and a second permission command to establish the permissions for a second tenant. The graphical user interface may be configured to receive at least one permission setting selected from group consisting of a read permission, a write permission, and a modify permission.

In some implementations, the method includes causing, by a processor of the computing application, the permissions for the first tenant and the second tenant to be set using the received first permission command and the received second permission command.

In some implementations, the method further includes receiving, in the workspace at the graphical user interface of the computing application, a third permission command to establish the permissions for a third tenant of the tenants where the graphical user interface shows the first object and the second object as hierarchical subunits of the third object.

In one aspect, the present disclosure describes a system including a processor and a memory, the memory storing instruction that, when executed by the processor, cause the processor to provide a computing application for setting permissions for accessing data entries of a multi-tenant database. The data entries stores data associated with one or more computing devices where the multi-tenant database is accessible by two or more tenants. The tenants may include a first sub-tenant and a second sub-tenant where sub-tenants are a part of the first tenant. The tenants may include a third sub-tenant and a fourth sub-tenant where the sub-tenants are a part of the second tenant. At least two of the tenants may not be part of the same organization or company.

In some implementations, the instructions, when executed, further cause the processor to display, via the computing application, a graphical user interface associated with the computer where the graphical user interface displays the tenants in a single workspace, and wherein the tenants are displayed with a hierarchical structure. The graphical user interface may display each of the tenants as an object where the object includes an graphical input to add a sub-tenant to the respective tenants. The graphical user interface may display each of the tenants as an object where the object includes an graphical input to add a sub-tenant to the respective tenants.

In some implementations, the instructions, when executed, further cause the processor to receive, in the workspace at the graphical user interface of the computing application, a first permission command to establish the permissions for a first tenant and a second permission command to establish the permissions for a second tenant. The graphical user interface may be configured to receive at least one permission setting selected from group consisting of a read permission, a write permission, and a modify permission.

In some implementations, the instructions, when executed, further cause the processor to cause, by a processor of the computing application, the permissions for the tenants to be set using the received permission commands.

In some implementations, the instructions, when executed, further cause the processor to receive, in the workspace at the graphical user interface of the computing application, a third permission command to establish the permissions for a third tenant where the graphical user interface shows the first object and the second object as hierarchical subunits of the third object.

In one aspect, the present disclosure describes a non-transitory computer readable medium having instructions stored thereon, where the instructions, when executed by a processor, cause the processor to provide a computing application for setting permissions for accessing data entries of a multi-tenant database. The data entries stores data associated with a number of computing devices where the multi-tenant database is accessible by two or more tenants. The tenants may include a first sub-tenant and a second sub-tenant where the sub-tenants are a part of the first tenant. The tenants may include a third sub-tenant and a fourth sub-tenant where the sub-tenants are a part of the second tenant. At least two of the tenants may not be part of the same organization or company.

In some implementations, the instructions, when executed, further cause the processor to display, via the computing application, a graphical user interface associated with the computer where the graphical user interface displays the tenants in a single workspace, and wherein the tenants are displayed with a hierarchical structure. The graphical user interface may display each of the tenants tenant as an object where the object include an graphical input to add a sub-tenant to the respective tenants. The graphical user interface may display each of the tenants as an object where the object include an graphical input to add a sub-tenant to the respective tenants.

In some implementations, the instructions, when executed, further cause the processor to receive, in the workspace at the graphical user interface of the computing application, a first permission command to establish the permissions for a first tenant and a second permission command to establish the permissions for a second tenant. The graphical user interface may be configured to receive at least one permission setting selected from group consisting of a read permission, a write permission, and a modify permission.

In some implementations, the instructions, when executed, further cause the processor to cause, by a processor of the computing application, the permissions for the tenants to be set using the received first permission command and the received second permission command.

In some implementations, the instructions, when executed, further cause the processor to receive, in the workspace at the graphical user interface of the computing application, a third permission command to establish the permissions for a third tenant where the graphical user interface shows the first object and the second object as hierarchical subunits of the third object.

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 7 is an example graphical user interface for adding a given asset in accordance with another embodiment of the invention.

Figure 1:
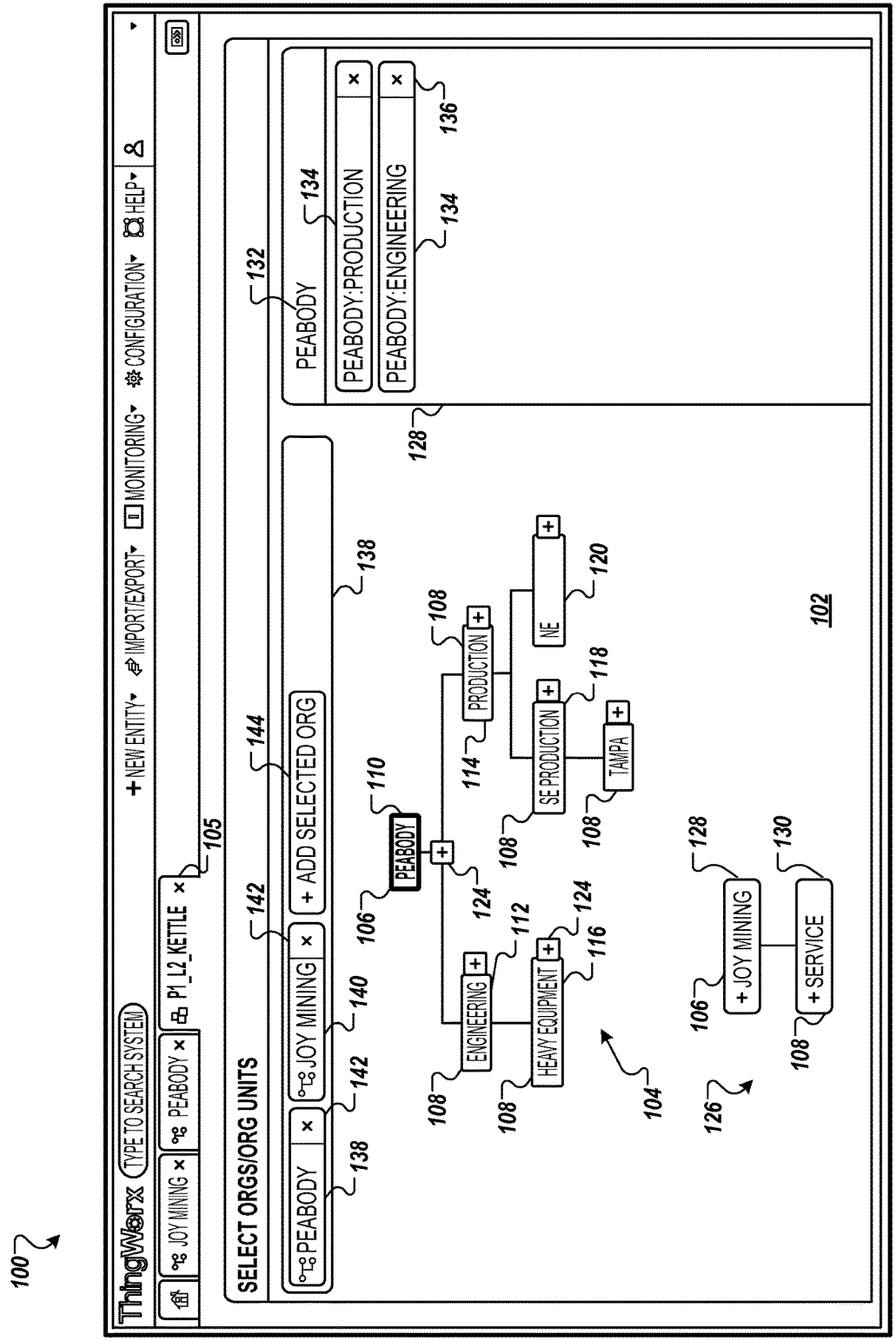
FIG. 1 is an example graphical user interface for establishing permissions using an organization matrices in accordance with an embodiment of the invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

FIG. 1 is an example graphical user interface 100 for establishing permissions using an organization matrices in accordance with an embodiment of the invention.

The graphical user interface 100 includes a main workspace 102 that allows an end-user to establish permissions for a multi-tenant database associated to a given asset (or asset class) for one or more tenants and/or sub-tenants using a hierarchical structure 104. The graphical user interface 100 may display the visibility permissions on a single workspace associated to a given device (or asset class). This display provides additional organization relationship not readily apparent in a list. To this end, an administrator setting the permission can readily identify participants that are incorrectly assigned permission to access data of the given device (or asset class).

In some implementations, an asset is an electronic device to which a given data is associated. For example, in some implementations, the data may be associated to industrial equipment, retail equipment vending machines, transport vehicles, personal computing devices, cellphones, tablets, power generation equipment, power distribution equipment, hospital equipment, medical equipment, computing equipment, rental car fleets, mining equipment, warehouse equipment, among others. As show, the asset is a type of mining machinery, referred to as "P1_L2_KETTLE" 105.

In some implementations, a hierarchical structure 104 may include an organization chart. In some implementations, a hierarchical structure 104 may include Venn diagrams, three-dimensional charts, linked diagrams, tab-indented lists, and other spatial representations by which hierarchical relationships can be visually determined.

In some implementations, the graphical user interface 100 displays each of the tenants 106 and the sub-tenants 108 in an hierarchical diagram 104 (such as an organization chart). In some implementations, an hierarchical diagram 104 is a diagram that shows the structure of other sub-organizations in a given organization and relationships among them. In some implementations, a hierarchical diagram 104 is a diagram that shows relationships among organizations as it defines whether elements of the organizations are shared or not shared. In some implementations, a hierarchical diagram 104 is made up of an organizational matrices of organization units.

A hierarchical diagram 104 may include one or more sub-units, which may have sub-units of its own. In some implementations, the primary unit in the main workspace 102 is the tenant 106, and the subunits are sub-tenants 108.

Each of the tenants 106 and the sub-tenants 108 may represent and allow permission controls for a given organization having a collection of members. A member may be represented as an individual user account in the system. The individual user account may be associated, for example, with or belong to a particular organization, company, corporation, government, entity, group, circle, user-base, or tag.

In some implementations, the user-accounts in the organization may belong to or be associated with a smaller distinct group within the organization and are referred to as a sub-organization. Examples of sub-organizations may be departments, teams, task forces, individuals, or partner organizations. Sub-organizations are considered to belong to the organization of which they are a part of. In some implementations, the organization may be referred to as the parent and the sub-organization is referred to as a child.

In some implementations, the hierarchical diagram 104 indicates the root parent organization in the hierarchy by placing it at the top of the chart. Children of the parent organization are indicated by a line drawn from the parent to the child graphically positioned below the parent. A given sub-organizations may include another sub-organization.

For example, as shown in this example, the hierarchical diagram 104 includes a tenant (or parent) "Peabody Company", shown as "Peabody 110", and sub-tenants (or child) "Engineering Division" and "Production Division", shown as "Engineering" 112 and "Production" 114. The Engineering sub-organization 112 has a child "Heavy Equipment Sub-Divisions", shown as "Heavy equipment" 116. The Production sub-organization 114 has children "South East Production" and "North East Production", shown as "SE Production" 118 and "NE Production" 120. The SE Production sub-organization 122 has a child "Tampa Office," shown as "Tampa" 122.

Although depicted as a top-down hierarchy in this implementation, the hierarchy diagram 104 may take any form which facilitates the modification of the organizational structure according to the hierarchical nature described. Thus, the hierarchy diagram 104 may be represented in a horizontal manner with the root parent positioned graphically left or right of the children. The hierarchy diagram 104 may be represented with the root parent positioned graphically below the children. Furthermore, the present disclosure contemplates other organizational charts which adequately represent the hierarchical relationships of organizations and sub-organizations within the organizational units.

In some implementations, the graphical user interface 100 provides an input 124a to add children (i.e., sub-tenant). A selection of the button 124a corresponding to the Peabody organization may, for example, create a child organization that is parallel in the hierarchy to Engineering and Production.

In some implementations, a tenant 106 or sub-tenant 108 may be "dragged and dropped" into the workspace from a list of existing organizations and sub-organizations.

To allow for collaborative data sharing among organizations, in some implementations, the interface may allow for co-tenants 126 to be added and displayed in the main workspace 102. To this end, permissions for organizations that are not associated to one another, rather than by a given asset, may be established for a single workspace. To this end, any inadvertent assignment of permission to an entity may be quickly identified by an end-use using the graphical user interface 100 to set permissions.

In some implementations, the graphical user interface 100 may update a sub-tenant workspace 128 in response to a selection of a tenant 106 or a sub-tenant 108 in the main workspace 102. The sub-tenant workspace 128 may identify the selected organization 132 in the main workspace 102 and a list of sub-tenants 134 associated to the selected item 132. In this example, an end-user has selected "Peabody" 110 in the workspace 102. To this end, the sub-tenant workspace 128 displays the two sub-tenants 112, 118, namely "Engineering" 112 and "Production" 114. The sub-tenant workspace 128 may include an input 136 to remove a given sub-tenant 108 from a given parent (i.e., the parent item 132 being displayed sub-organization workspace 128).

In some implementations, the graphical user interface 100 may include a tenant workspace to remove tenants, such as tenants 138 or 140 (corresponding to tenants 110 and 128), from the main workspace 102. As shown, the two tenants includes "Peabody" 110 and "Joy Mining" 106. Each of the tenants 106, 128 may include an input 142 for an end-user to remove a given tenant 106 from the main workspace 102.

In some implementations, the tenant workspace 136 may include an "add tenant" input 144. Upon selection of the input 144, the graphical user interface 100 may open a dialogue box for a user to select an organization to include from a list. Alternatively, the graphical user interface 100 may add a tenant icon (corresponding to a tenant 106) to the main workspace 102. The end-user can then select the added tenant icon (not shown) to modify its properties (including the corresponding organization) using the sub-tenant workspace 128 and/or the main workspace 102.

As shown, two co-tenant organizations 104, 126 are provided, including "Peabody" 106 and Joy Mining Company 126 (referred to as "Joy Mining" 128). Both "Peabody" 106 and "Joy Mining" 126 are root parent organizations. As co-tenants, the hierarchical diagram 104, 126 are not joined (e.g., shown in some implementations as a line) by an organizational link. "Joy Mining" 128 includes a "Service Division" sub-organization 1308 (referred to as "Service" 130).

In the main workspace 102, the end-user may add organizations (or sub-organizations) associated to either "Peabody" 110 or "Joy Mining" 128. To this end, an end-user may add sub-organizations to "Peabody" 106 or "Joy Mining" 126 using the "add" organization input 124. In some implementations, the selection of the input 124 may open a dialogue box to select an organization from an existing list or to add a new organization.

In some implementations, "Peabody" 110 and "Joy Mining" 128 may be depicted in the workspace 102 parallel to one another in the hierarchy. In some implementations, the graphical user interface 100 may display the hierarchical diagram 104, 106 only as a partial representation of the entire organizational chart. For example, in some implementations, only the tenants are shown. In another example, in some implementations, only the tenants 106 and a defined number of sub-tenants 108, specified with the graphical user interface 100 or by the end-user, are shown.

In some implementations, an organization may wish to grant permissions to particular sub-organizations or other organizations.

This may occur, for example, between companies engaged in an equipment service agreement. An example is a mining Company A that purchased mining equipment from a mining equipment Manufacturer B. Mining company A tracks its maintenance and operational data in the database. If mining Company A grants access to view the maintenance and operational data to manufacturer B, then Manufacturer B can use this information to improve its customer-service operations to mining company A. Manufacturer B may be able to use the maintenance and operational data to create or improve its best practices instructions regarding equipment usage, or to improve components which it observes are failing at a greater than expected rate. For instance, Manufacturer B may observe, directly through the maintenance and operational data collected in mining Company A's database, that bearings in its conveyor system are tending toward failure when operated for more than six hours continuously at ambient temperatures greater than 100° F. Manufacturer B can provide guidance to mining Company A that it should stagger operations at high ambient temperatures in order to allow the bearings to cool, or may determine that a modified lubrication regimen is required at high ambient temperatures, or may modify the construction of the equipment in future products. Both Manufacturer B and mining Company A benefit from this data sharing, since Manufacturer B is able to provide a higher quality of service, and mining company A reduces costs of equipment failure. Such data sharing arrangements may arise organically, or may be negotiated into contract. For example, Manufacturer B may negotiate such data collaborative endeavors into a purchase contract in exchange for some concession such as enhanced warranty service.

In another example, rather than mining Company A being the administrator, equipment Manufacturer B may be the administrator. Manufacturer B can make agreements with several mining companies (for example, Companies A, C, and D) to aggregate the maintenance and operational data to share among the companies, for example, as part of an after-market maintenance service agreement. Manufacturer B may provide a more efficient service in having shared equipment (i.e., less equipment to operate and maintain) to which the mining companies may benefit. Additionally, Manufacturer B may have determine inter-companies best practices or observe inter-companies issues in having aggregated data from all of the mining companies to which Manufacturer B can share in an aggregated manner with the mining companies. Additionally, manufacturer B may improve its products and services using the aggregated set of operational data.

Another example of an organizational relationship which would benefit from collaborative information sharing are naturally symbiotic industries, such as those in which there are producers of a product or equipment, and organizations which operate to service that producer's product. Examples of such industries are automobile manufacturers and automobile dealers, computing device manufacturers and computer service contractors, and the like. For example, an automobile dealer may provide information about maintenance operations and equipment failures, which the automobile manufacturer can use to suggest improved maintenance guidelines and to modify future equipment design. Furthermore, such information, when aggregated from multiple dealers, may enable the manufacturer to anticipate demand for components that are being frequently replaced due to failure, and increase production of replacement components.

An additional organizational structure which may benefit from information sharing are the various sub-organizations under a parent organization. For example, a food product factory may have a broad array of subsidiary companies or departments which all belong to the parent company. Such sub-organizations or departments may include human resources, management, maintenance, sanitation, equipment operators, medical personnel, quality control, shipping and receiving, sales, information technology, and engineering.

Another example of collaborative information sharing may be between a city government and the utility companies. An electricity company may, with consent of the customer, enable the government, universities, and/or government agencies to access billing and electricity utilization information. Such information may be aggregated and used, for example, to anticipate electricity outages, potential capacity problems, or the need for government subsidies in order to increase the level of service.

Figure 2:
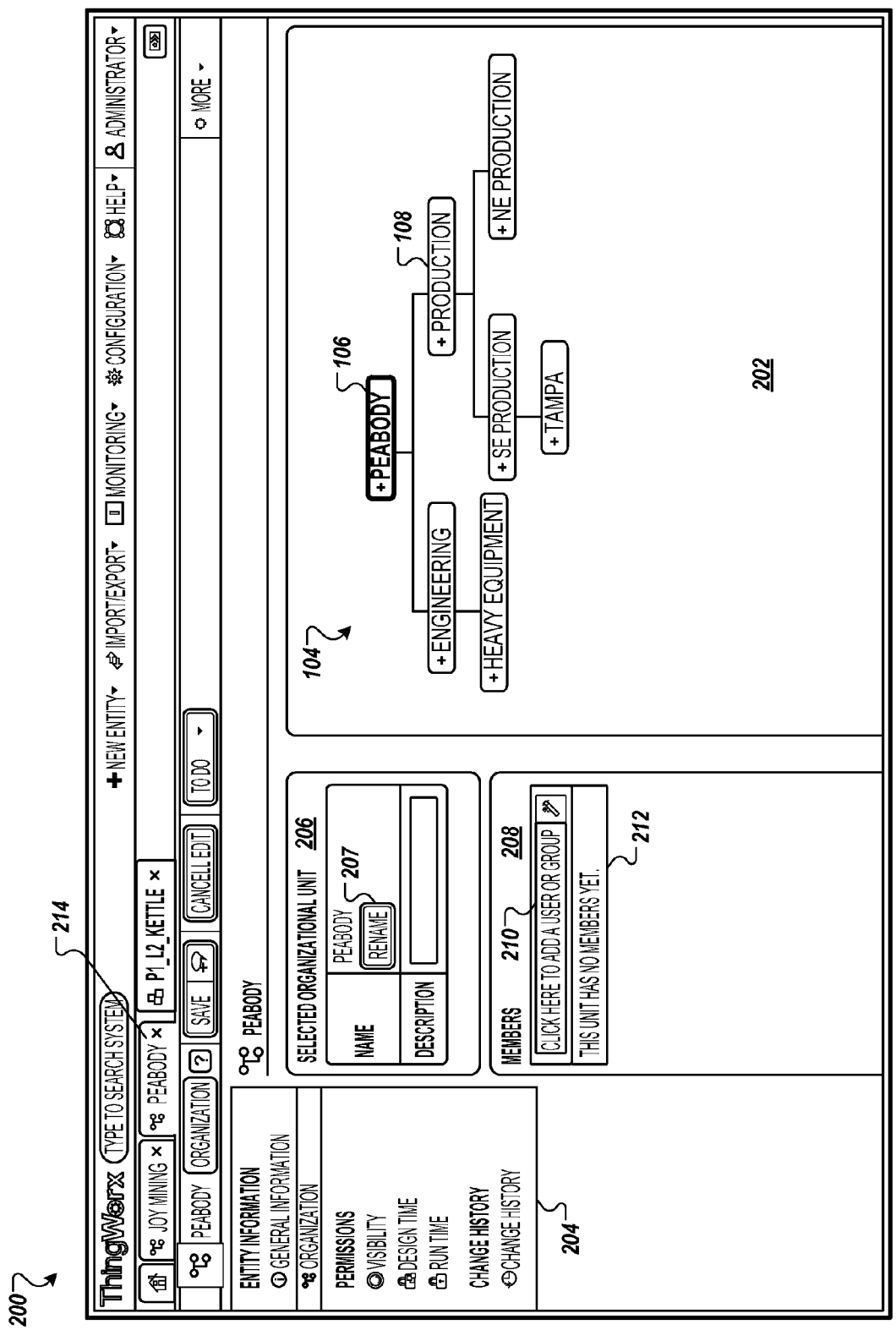
FIG. 2 is an example graphical user interface for establishing permissions using an organization matrices in accordance with another embodiment of the invention.

FIG. 2 is an example graphical user interface 100 for establishing permissions using an organization matrices in accordance with another embodiment of the invention.

In some implementations, the graphical user interface 100 may include an organization workspace 202 to edit properties and members of a given organization. The organization workspace 202 may display the hierarchical diagram 104 of a given organization, including the tenant and its sub-tenants.

When selected, a given tenant or sub-tenant may be highlighted or enunciated in the organization workspace 202. In some implementations, the graphical user interface 100 may include a properties workspace 206 to display information relating to a given tenants 106 or sub-tenants 108 selected in the organization workspace 202. The properties workspace 206 may allow the end user to rename (see, for example, via input 207) the organization as being displayed. The end user may also as a description of the organization using the properties workspace 206.

The main workspace 102 may include an members workspace 208 to display members of the organization. A member may be a part of a sub-tenant or a tenant and generally refers to actual end-users. The members workspace 208 may include an input 210 to add additional members. The members workspace 208 may display a list 212 of existing members within a selected organization. When there are no members included, the members workspace 208 may indicate that the selected organization includes no members having permissions.

In some implementations, the graphical user interface 100 may include setting granular permission controls 204 for a given tenant/sub-tenant. The granular permission controls 204 may include read access, write access, modify access, and change permissions access for an organization or its members and may be specific for operation during design time and during run-time.

In some implementations, if visibility permission is granted to an organization unit, then visibility permission/access is also extended to members of the organizations. The granular security-model may then be employed to grant specific permissions to any users/members of that organization unit.

Figure 3:
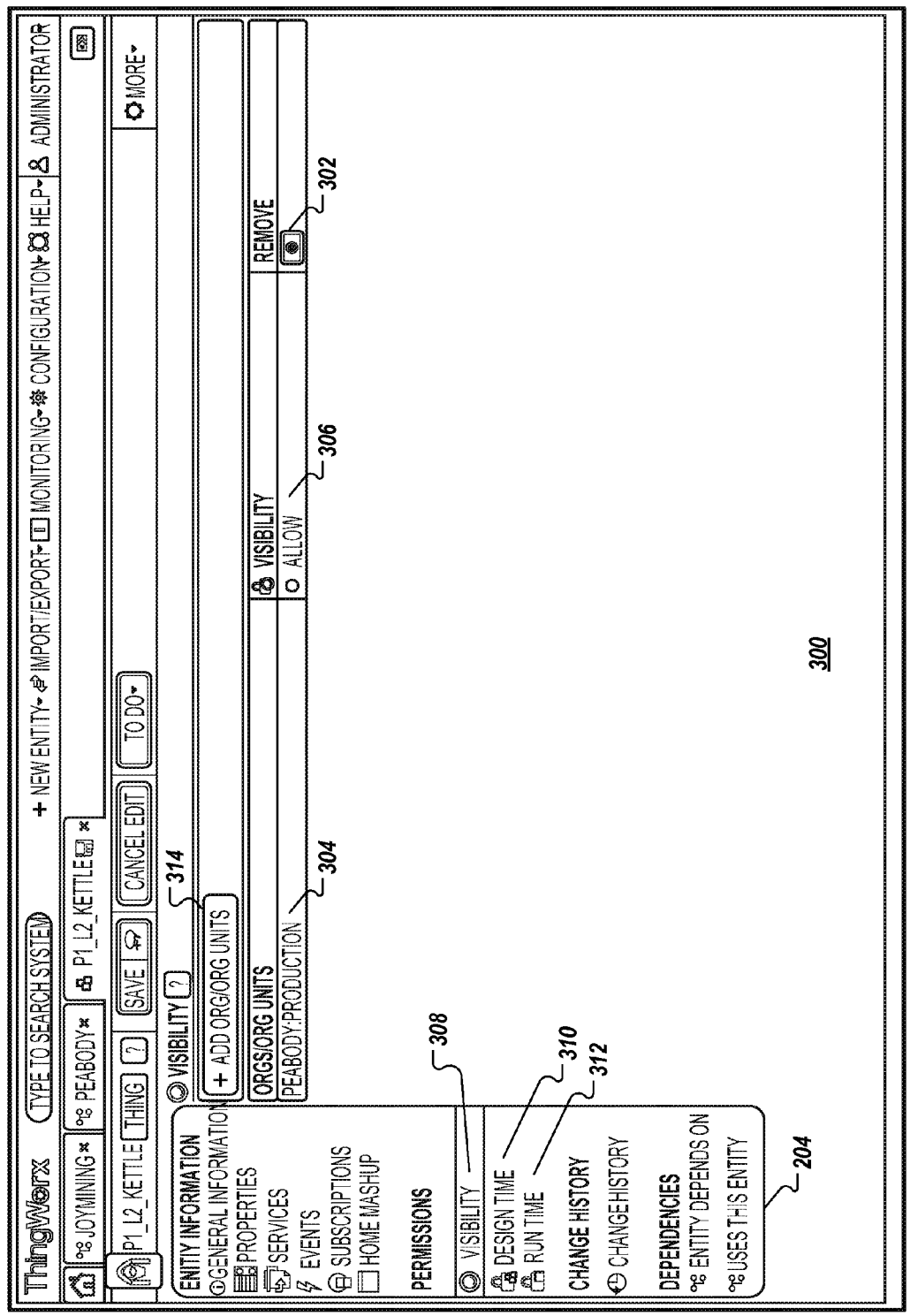
FIG. 3 is an example graphical user interface for establishing granular permission-controls for a given asset for an organization in accordance with an embodiment of the invention.

FIG. 3 is an example graphical user interface 100 for establishing granular permissions controls for a given asset for an organization in accordance with an embodiment of the invention. Specifically, the graphical user interface 100 includes a workspace 300 to display a list of organizations and/or tenants and sub-tenants to which visibility permission is provided. The workspace 300 may include an input 302 to remove a given organization 304 from the list. The workspace 300 may include an input 314 to add permissions for an organization or organization unit. The input 314 may open the main workspace 102, as described in relation to FIG. 1.

The graphical user interface 100 may include a workspace to display a list of organizations and/or tenants to which design-time permission or run-time permission is provided. The design-time permission may be displayed when an end-user selects "design-time" input 310 from the granular permission controls 204. The run-time permission may be displayed when an end-user selects "run-time" input 312 from the granular permission controls 204.

In another aspect of an embodiment of the invention, the graphical user interface 100 may allow a user to configure a class of assets.

Figure 4:
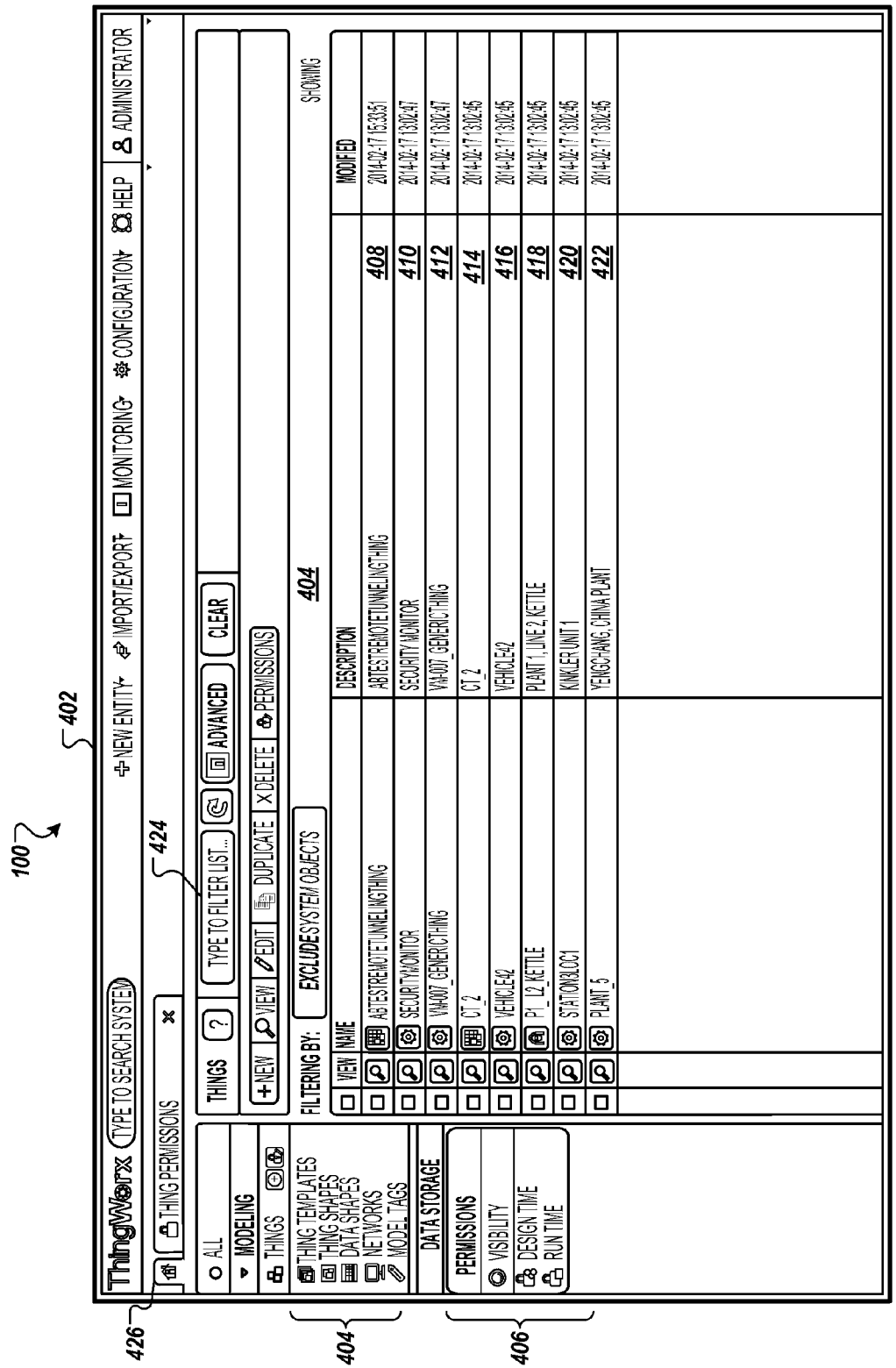
FIG. 4 is an example graphical user interface for establishing permissions controls for a class of asset for an organization in accordance with an embodiment of the invention.

FIG. 4 is an example graphical user interface 100 for establishing permissions controls for a class of asset for an organization in accordance with an embodiment of the invention.

In some implementations, a class of assets may refer to a type, rather than individual instance, of a given electronic device. For example, where an asset may be a specific object (for example, a truck), a class of assets may correspond to multiple objects having a set of common properties defined by the class/template. The class of assets may be defined by a data template of the object in which the data template includes one or more properties that define the class/template. For example, the template may include common properties and information that determines or defines what constitute a truck.

In some implementations, the graphical user interface 100 includes a workspace 402 for managing classes of assets. The classes of assets may be part of a development software to build and manage a data-and information-model of assets and classes. In some implementations, the class of assets is referred to as a "Thing". A "Thing" may be defined as an instance of a "Thing Template." A "Thing Template" may be an abstract class that can inherit from one or more "Thing Shapes," which is defined by a set of properties, services, and events, "Thing Template," and "Thing instance." To this end, if a "Thing Template" inherits from one or more "Thing Shapes", all of the properties, events, and services of the "Thing Shapes" are part of the "Thing Template." When a "Thing instance" is created from a "Thing Template", all of the properties, events, and services of the "Thing Template" are realized within the "Thing instance." Thus, if a new service, property, or capability is defined at the "Thing Shape" or "Thing Template" level, each "Thing" instance that is derived from those entities immediately inherits that service, property or capability. To this end, once a new "Thing" is defined in the model, the full set of services and data for the "Thing" is available as a class. Examples of methods of class of assets, as "Things", are described in co-pending and concurrently filed U.S. patent application, titled "SYSTEM AND METHOD OF ABSTRACTING COMMUNICATION PROTOCOL USING SELF-DESCRIBING MESSAGES", filed Mar. 21, 2014, naming inventors Rick Bullotta, John Canosa, Bob DeRemer, and Mike Mahoney, and published as U.S. Publication No. 2015/0271299. The text of this application is incorporated by reference in its entirety.

In some implementations, a class of assets may include a set of machinery at an industrial complex having data stored in a given database; a set of computer or an office equipment at a business or government office having data stored in a given database; a set of point-of-sale machine at a market place or vending machines having data stored in a given database; a set of construction equipment or vehicles having data stored in a given database; a set of power generation or distribution equipment having data stored in a given database; a set of power substation or a transmission equipment having data stored in a given database; a set of building meter having data stored in a given database; a set of server having operational data stored in a given database; a set of networking or routing equipment having data stored in a given database; a set of smart appliance having data stored in a given database; a set of exercise machines having data stored in a given database; a set of medical device or prosthesis devices having data stored in a given database; a set of medical diagnostic devices or hospital equipment having data stored in a given database; a set of commercial vehicles or transport containers having data stored in a given database; a set of motor vehicles or electric bicycles having data stored in a given database; a set of cellphones having data stored in a given database, a set of laptops having data stored in a given database, a set of tablet having data stored in a given database, a set of electronic readers having data stored in a given database; or a set of clothing electronic-tag having data stored in a given database.

Referring back to FIG. 4, the workspace 404 includes example types of assets and classes of assets. These assets and classes of assets include sensors 408, security equipment 410, vending machines 412, medical equipment 414, vehicles 416, plant equipment 418, mining equipment 420, and factory machinery 422. A sensor equipment 408, for example, is shown as "AB Test Remote Tunneling Thing" 408. A security equipment 410 is shown as "Security Monitor" 410. A vending machine 412 is shown as "VM-007 Generic Thing" 412. A medical equipment 414 is shown as "CT-2" 414. A class of vehicles 416 is shown as "Vehicle 42" 416. A plant equipment 418 is shown as "P1 L2 Kettle" 418 (referring to a kettle machine on line 2 of a given plant 1). A mining equipment 420 is shown as "Station 3 LOCI" 420. A factory equipment 422 is shown as "Plant 5" 422 (referring to a factory in Yengchang, China).

In some implementations, the graphical user interface 100 may include a search function 424 to search among the classes of assets within the multi-tenant database.

In some implementations, the graphical user interface 100 may include tabs to navigate among the workspaces of the graphical user interface 100.

In some implementations, the graphical user interface 100 may include permission controls 406, such as for design-time permissions, run-time permissions, and visibility permissions, as described in relation to a given asset in FIG. 3.

Figure 5:
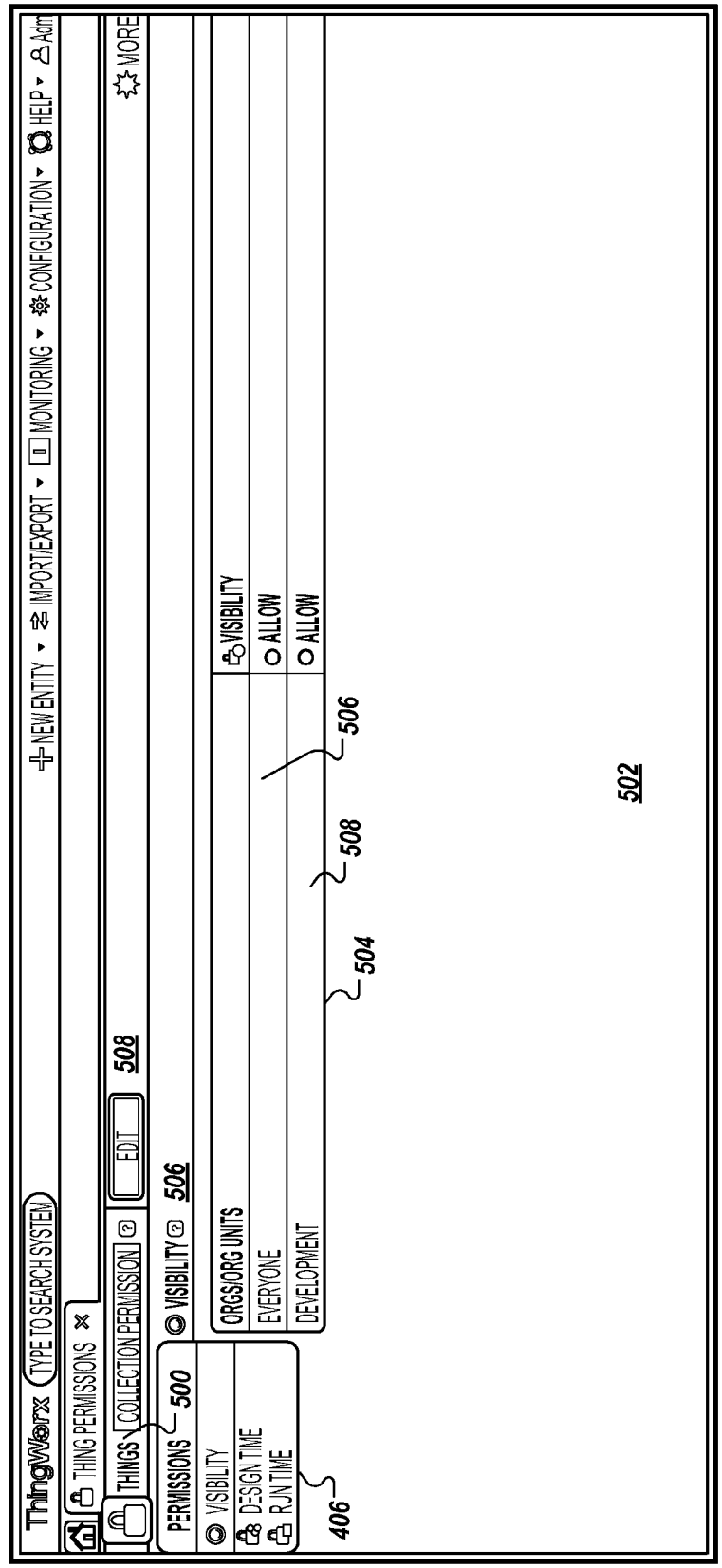
FIG. 5 is an example graphical user interface for establishing permissions controls for a class of asset for an organization in accordance with another embodiment of the invention.

FIG. 5 is an example graphical user interface 100 for establishing permissions controls for a class of asset for an organization in accordance with another embodiment of the invention.

In some implementations, the graphical user interface 100 includes a workspace 502 to configure permissions for a class of members for a given asset or a class of assets. As shown, the workspace 502 displays visibility permissions for a class of members, including "Everyone" 506 and "Development" 508 for a general class of assets. Such class of assets may be a "Things" 510, as described in relation to FIG. 4.

Figure 6:
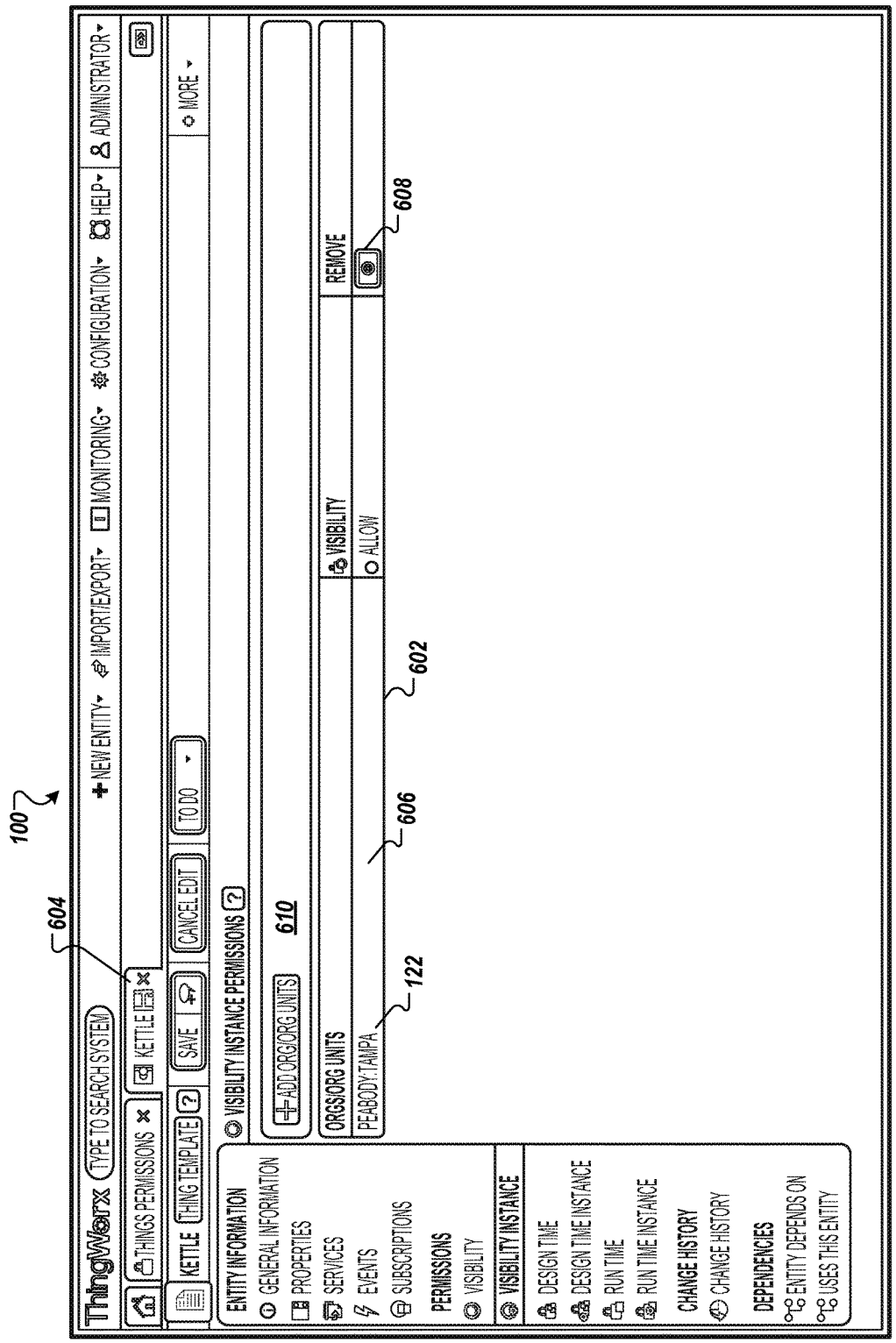
FIG. 6 is an example graphical user interface for establishing permissions controls for a class of asset for an organization in accordance with another embodiment of the invention.

FIG. 6 is an example graphical user interface 100 for establishing permissions controls for a class of asset for an organization in accordance with another embodiment of the invention.

In some implementations, the graphical user interface 100 includes a permission panel 602 to establish permissions for a class of assets. In some implementations, the permission panel 602 includes a list of visibility permission given to a set of organization units.

As shown, the graphical user interface 100 is configured to set permissions for a class of factory equipment "Kettle" 604. The permission is provided to organization 606, such as the "Tampa office" 122 of the Peabody South East Production Division," as described in FIG. 1. The "Tampa office" 122 is shown as "Peabody:Tampa" 122. The workspace 602 includes a remove button 608 to remove Peabody:Tampa from the list of organizational units with visibility permission.

In some implementations, the graphical user interface 100 includes an add button 610 (e.g., "Add Org/Org Units" 610) to add members to the list to visibility permissions given for a class of assets. In some implementations, the selection may be made using "drag and drop" mechanism, checkbox selection, and text entry types of interface.

Figure 7:
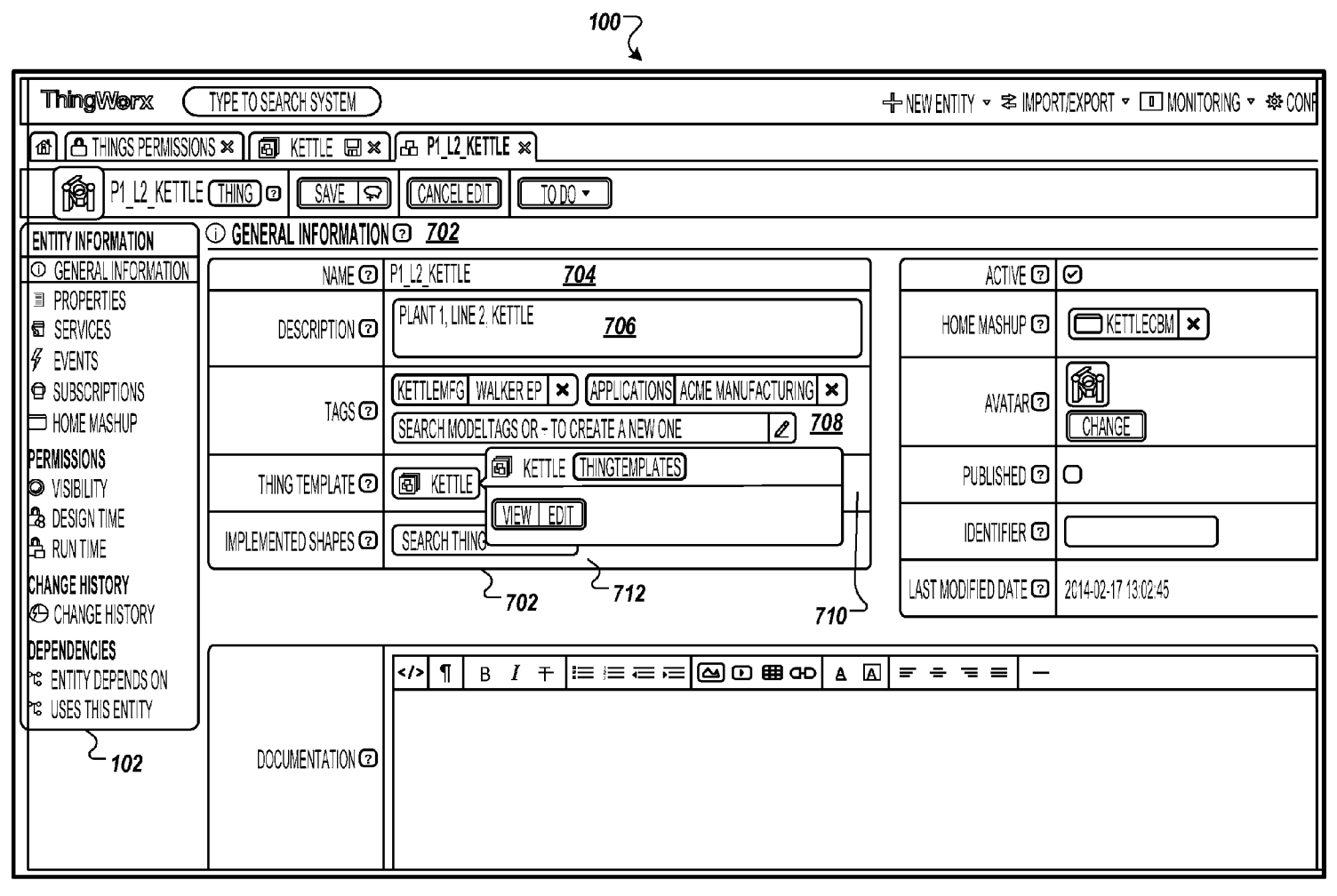

FIG. 7 is an example graphical user interface 100 for adding a given asset in accordance with another embodiment of the invention.

In some implementations, the graphical user interface 100 includes a workspace 702 to add a given asset derived from an asset class. The workspace 702 may include a name field 704, a description field 706, a tag field 708, an asset template 710 (e.g., a "Thing Template"), and a Datashape definition 712.

In some implementations, the name field 704 provides a name of a given asset. As shown, the asset is an "P1_L2_Kettle," as described in relation to FIG. 1.

In some implementations, the tag field 708 provides metadata labels for the asset (or class of assets). For example, as shown, the "P1_L2_Kettle" 105 includes a type of equipment tag 714 as well as a location tag 716. The equipment tag 714, here, defines "P1_L2_Kettle" as a type of kettle manufacturing equipment ("KettleMfg" located at "Walker EP"). The location tag 716, here, defines "P1_L2_Kettle" as a type of application (located at "Acme Manufacturing").

In some implementations, the asset template 710 provides a definition of the asset class (here, shown as "Kettle"), as described in relation to FIG. 6. The asset template 710 may be a ThingTemplate, as described in relation to FIG. 4.

In some implementations, the Datashape definition 712 provides a definition of a DataShape, as described in relation to FIG. 4.

Figure 8:
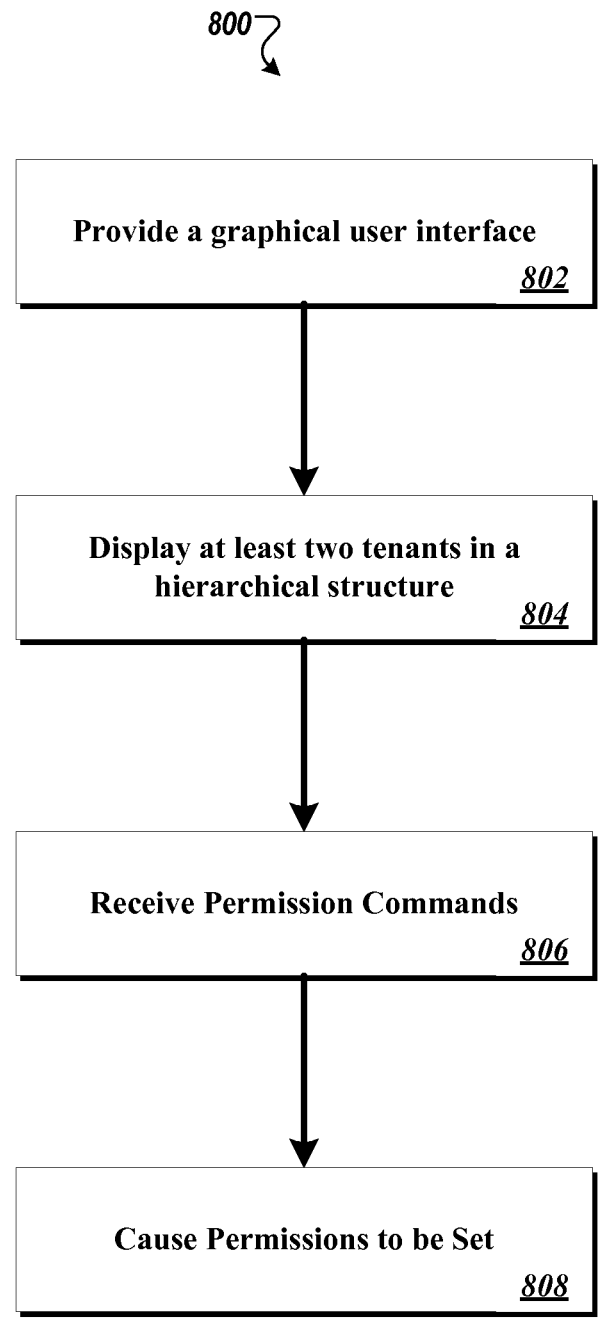
FIG. 8 is a flowchart of an example method of establishing permissions using an organization matrices in accordance with an embodiment of the invention.

FIG. 8 is a flowchart of an example method 800 of establishing permissions using an organization matrices in accordance with an embodiment of the invention.

In some implementations, the method 800 includes providing, by a processor of a computer, a computing application for setting permissions for accessing data entries of a multi-tenant database (step 802). The data entries may store data associated with a number of computing devices where the multi-tenant database is accessible by two or more tenants (such as 104), as described in relation to FIG. 1. The two or more tenants may include a first sub-tenant and a second sub-tenant where the first sub-tenant and the second sub-tenant are a part of the first tenant. The tenants may include a third sub-tenant and a fourth sub-tenant where the third sub-tenant and the fourth sub-tenant are a part of the second tenant.

In some implementations, at least two of the tenants may not be a part of the same organization. The graphical user interface 100 may be configured to receive at least one permission setting selected from group consisting of a read permission, a write permission, and a modify permission.

In some implementations, the method 800 includes displaying, via the computing application, a graphical user interface 100 associated with the computer where the graphical user interface 100 displays the one or more tenants (such as 104) in a single workspace (such as 102) and where the tenants are displayed with a hierarchical structure (step 804). The graphical user interface 100 may display each of the first tenant and second tenant as an object where the object include an graphical input to add a sub-tenant to the respective first tenant and second tenant.

In some implementations, the method 800 includes receiving, in the workspace at the graphical user interface, a first permission command to establish the permissions for a first tenant and a second permission command to establish the permissions for a second tenant of the two or more tenants (step 806).

In some implementations, the method 800 includes causing, by a processor of the computing application, the permissions for the first tenant and the second tenant to be set using the received first permission command and the received second permission command (step 808).

In some implementations, the method may further include receiving, in the workspace at the graphical user interface of the computing application, a third permission command to establish the permissions for a third tenant where the graphical user interface shows the first object and the second object as hierarchical subunits of the third object.

Figure 9:
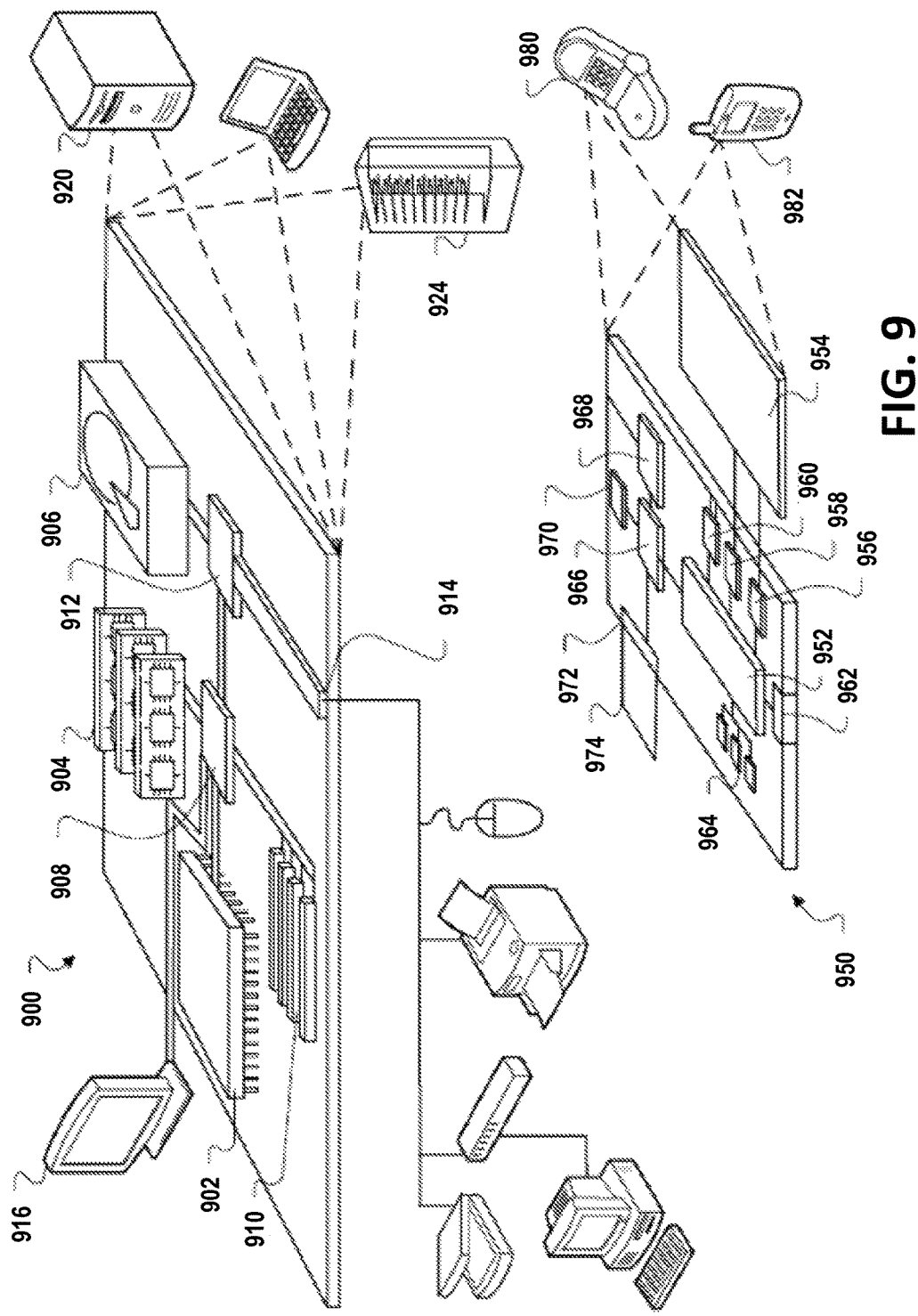
FIG. 9 shows an example of a computing device and a mobile computing device that can be used to implement the techniques described in this disclosure.

FIG. 9 shows an example of a computing device 900 and a mobile computing device 950 that can be used to implement the techniques described in this disclosure. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 909, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 909 manages bandwidth-intensive operations for the computing device 900, while the low-speed interface 912 manages lower bandwidth-intensive operations. Such allocation of functions is an example only. In some implementations, the high-speed interface 909 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. That the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth®, Wi-Fi™, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for determining transaction approval based in part upon consumer purchase behavior are provided. Having described certain implementations of methods and apparatus for supporting transaction approval determination, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A computer-implemented method comprising:
providing, by a processor of a computing device, a graphical user interface for setting visibility permissions for an information model used to manage data entries of a multi-tenant database, the data entries storing data collected from sensors each of which sensors is associated with one of a plurality of computing devices, wherein the multi-tenant database is accessible by two or more tenants, including a first tenant and a second tenant, wherein the first tenant and second tenant are separate business entities, wherein the information model comprises a plurality of asset templates comprising a set of properties, description, and services, wherein an instance of a given computing device of the plurality of computing devices, upon being instantiated in the information model, has an associated set of properties, description, and services of one or more asset templates that define the instance, and wherein permissions for data entries associated with the given computing device are configurable by the instance of the given computing device and by the one or more asset templates that define the instance, wherein a visibility permission command when applied to an asset template of the one or more asset templates is automatically applied to one or more instances instantiated from the asset template;

displaying, by the processor, the two or more tenants in a single workspace of the graphical user interface, wherein each of the two or more tenants are displayed as a graphical object and as a root node in a separate and non-connected hierarchical structure, including a first root node in a first hierarchical structure and a second root node in a second hierarchical structure, wherein the first hierarchical structure associated with the first tenant is presented as a set of one or more nodes with links connected therebetween that are simultaneously and non-connectedly displayed with a set of one or more nodes and links that represent the second hierarchical structure associated with the second tenant;

receiving, by the processor, a first permission command associated with the first tenant and a second permission command associated with the second tenant, wherein the first permission command comprises a single visibility permission to the information model that is applied for all members of an organization corresponding to the first tenant in the first hierarchical structure, and wherein the second permission command comprises another single visibility permission to the information model that is applied for all members of an organization corresponding to the second tenant in the second hierarchical structure; and causing, by the processor, the visibility permissions to the information model for each of the first tenant and the second tenant to be set using the received first permission command and the received second permission command, wherein granular security permissions to a given instance and to a given asset template can be granted for members of the two or more tenants once visibility permission is granted for the two or more tenants.

2. The computer-implemented method of claim 1, wherein the multi-tenant database is accessible by one or more sub-tenants that are associatively linked to at least one of the two or more tenants, including a first sub-tenant and a second sub-tenant, wherein the first sub-tenant is associatively linked to the first tenant and is presented as a first child node of the first root node in the first hierarchical structure, and wherein the second sub-tenant is associatively linked to the first tenant and is presented as a second child node of the first root node in the first hierarchal structure.

3. The computer-implemented method of claim 2, wherein each of the graphical objects associated with the two or more tenants and the one or more sub-tenants include a graphical input, wherein selection of the graphical input causes a subsequent graphical object associated with an additional sub-tenant to be added thereto in the two or more hierarchical structures.

4. The computer-implemented method of claim 1, wherein the multi-tenant database is accessible by one or more sub-tenants that are associatively linked to at least one of the two or more tenants, including a third sub-tenant and a fourth sub-tenant, wherein the third sub-tenant is associatively linked to the first tenant and is presented as a first child node of the first root node in the first hierarchical structure, and wherein the fourth sub-tenant is associatively linked to the first sub-tenant and is presented as a second child node of the first child node in the first hierarchal structure.

5. The computer-implemented method of claim 4 further comprising:

receiving, by the processor, a third permission command associated with the third sub-tenant, wherein the third permission command comprises a single visibility permission to the information model that is applied for all members of an organization corresponding to the third sub-tenant in the first hierarchical structure; and causing, by the processor, the visibility permissions to the information model for the third sub-tenant to be set using the received third permission command, wherein granular security permissions to the given instance and to the given asset template can be granted for members of the one or more sub-tenants once visibility permission is granted for the one or more sub-tenants.

6. The computer-implemented method of claim 1, wherein the graphical user interface is configured to receive at least one permission setting selected from the group consisting of a read permission, a write permission, a visibility permission, and a modify permission.

7. The computer-implemented method of claim 1, wherein the first permission command is directed to the asset template.

8. A system comprising:
a processor; and
a memory, the memory storing instructions that, when executed by the processor, cause the processor to:

provide a graphical user interface for setting visibility permissions for an information model used to manage data entries of a multi-tenant database, the data entries storing data collected from sensors each of which sensors is associated with one of a plurality of computing devices, wherein the multi-tenant database is accessible by two or more tenants, including a first tenant and a second tenant, wherein the first tenant and second tenant are separate business entities, wherein the information model comprises a plurality of asset templates comprising a set of properties, description, and services, wherein an instance of a given computing device of the plurality of computing devices, upon being instantiated in the information model, has an associated set of properties, description, and services of one or more asset templates that define the instance, and wherein permissions for data entries associated with the given computing device are configurable by the instance of the given computing device and by the one or more asset templates that define the instance, wherein a visibility permission command when applied to an asset template of the one or more asset templates is automatically applied to one or more instances instantiated from the asset template;

display the two or more tenants in a single workspace of the graphical user interface, wherein each of the two or more tenants are displayed as a graphical object and as a root node in a separate and non-connected hierarchical structure, including a first root node in a first hierarchical structure and a second root node in a second hierarchical structure, wherein the first hierarchical structure associated with the first tenant is presented as a set of one or more nodes with links connected therebetween that are simultaneously and non-connectedly displayed with a set of one or more nodes and links that represent the second hierarchical structure associated with the second tenant;

receive a first permission command associated with the first tenant and a second permission command associated with the second tenant, wherein the first permission command comprises a single visibility permission to the information model that is applied for all members of an organization corresponding to the first tenant in the first hierarchical structure, and wherein the second permission command comprises another single visibility permission to the information model that is applied for all members of an organization corresponding to the second tenant in the second hierarchical structure; and cause the visibility permissions to the information model for each of the first tenant and the second tenant to be set using the received first permission command and the received second permission command, wherein granular security permissions to a given instance and to a given asset template can be granted for members of the two or more tenants once visibility permission is granted for the two or more tenants.

9. The system of claim 8, wherein the multi-tenant database is accessible by one or more sub-tenants that are associatively linked to at least one of the two or more tenants, including a first sub-tenant and a second sub-tenant, wherein the first sub-tenant is associatively linked to the first tenant and is presented as a first child node of the first root node in the first hierarchical structure, and wherein the second sub-tenant is associatively linked to the first tenant and is presented as a second child node of the first root node in the first hierarchal structure.

10. The system of claim 8, wherein the multi-tenant database is accessible by one or more sub-tenants that are associatively linked to at least one of the two or more tenants, including a third sub-tenant and a fourth sub-tenant, wherein the third sub-tenant is associatively linked to the first tenant and is presented as a first child node of the first root node in the first hierarchical structure, and wherein the fourth sub-tenant is associatively linked to the first sub-tenant and is presented as a second child node of the first child node in the first hierarchical structure.

11. The system of claim 10, wherein the instructions, when executed by the processor, further cause the processor to:
   receive a third permission command associated with the third sub-tenant, wherein the third permission command comprises a single visibility permission to the information model that is applied for all members of an organization corresponding to the third sub-tenant in the first hierarchical structure; and,
   cause the visibility permissions to the information model for the third sub-tenant to be set using the received third permission command, wherein granular security permissions to the given instance and to the given asset template can be granted for members of the one or more sub-tenants once visibility permission is granted for the one or more sub-tenants.

12. The system of claim 8, wherein the graphical user interface is configured to receive at least one permission setting selected from the group consisting of a read permission, a write permission, a visibility permission, and a modify permission.

13. The system claim 8, wherein each of the graphical objects associated with the two or more tenants and the one or more sub-tenants include a graphical input, wherein selection of the graphical input causes a subsequent graphical object associated with an additional sub-tenant to be added thereto in the two or more hierarchical structures.

14. The system of claim 8, wherein the first permission command is directed to the asset template.

15. A non-transitory computer readable medium having instructions stored thereon, wherein the instructions, when executed by a processor, cause the processor to:
   provide a computing application for setting visibility permissions for an information model used to manage data entries of a multi-tenant database, the data entries storing data collected from sensors each of which sensors is associated with one of a plurality of computing devices, wherein the multi-tenant database is accessible by two or more tenants, including a first tenant and a second tenant, wherein the first tenant and second tenant are separate business entities, wherein the information model comprises a plurality of asset templates comprising a set of properties, description, and services, wherein an instance of a given computing device of the plurality of computing devices, upon being instantiated in the information model, has an associated set of properties, description, and services of one or more asset templates that define the instance, and wherein permissions for data entries associated with the given computing device are configurable by the instance of the given computing device and by the one or more asset templates that define the instance, wherein a visibility permission command when applied to an asset template of the one or more asset templates is automatically applied to one or more instances instantiated from the asset template;
   display a graphical user interface associated with the computer, wherein the graphical user interface displays each of the two or more tenants in a single workspace, and wherein the two or more tenants are displayed as a graphical object and as a root node in a separate and non-connected hierarchical structure, including a first root node in a first hierarchical structure and a second root node in a second hierarchical structure, wherein the first hierarchical structure associated with the first tenant is presented as a set of one or more nodes with links connected therebetween that are simultaneously and non-connectedly displayed with a set of one or more nodes and links that represent the second hierarchical structure associated with the second tenant;
   receive a first permission command associated with the first tenant and a second permission command associated with the second tenant, wherein the first permission command comprises a single visibility permission to the information model that is applied for all members of an organization corresponding to the first tenant in the first hierarchical structure, and wherein the second permission command comprises another single visibility permission to the information model that is applied for all members of an organization corresponding to the second tenant in the second hierarchical structure; and
   cause the visibility permissions to the information model for each of the first tenant and the second tenant to be set using the received first permission command and the received second permission command, wherein granular security permissions to a given instance and to a given asset template can be granted for members of the two or more tenants once visibility permission is granted for the two or more tenants.

16. The computer readable medium of claim 15, wherein the multi-tenant database is accessible by one or more sub-tenants that are associatively linked to at least one of the two or more tenants, including a first sub-tenant and a second sub-tenant, wherein the first sub-tenant is associatively linked to the first tenant and is presented as a first child node of the first root node in the first hierarchical structure, and wherein the second sub-tenant is associatively linked to the first tenant and is presented as a second child node of the first root node in the first hierarchal structure.

17. The computer readable medium of claim 15, wherein the multi-tenant database is accessible by one or more sub-tenants that are associatively linked to at least one of the two or more tenants, including a third sub-tenant and a fourth sub-tenant, wherein the third sub-tenant is associatively linked to the first tenant and is presented as a first child node of the first root node in the first hierarchical structure, and wherein the fourth sub-tenant is associatively linked to the first sub-tenant and is presented as a second child node of the first child node in the first hierarchical structure.

18. The computer readable medium of claim 17, wherein the instructions, when executed by the processor, cause the processor to:
   receive a third permission command associated with the third tenant, wherein the third permission command comprises a single visibility permission to the information model that is applied for all members of an organization corresponding to the third sub-tenant in the first hierarchical structure; and
   cause the visibility permissions to the information model for the third sub-tenant to be set using the received third permission command, wherein granular security permissions to the given instance and to the given asset template can be granted for members of the one or more sub-tenants once visibility permission is granted for the one or more sub-tenants.

19. The computer readable medium of claim 15, wherein the graphical user interface is configured to receive at least one permission setting selected from group consisting of a read permission, a write permission, a visibility permission, and a modify permission.

20. The computer readable medium of claim 15, wherein each of the graphical objects associated with the two or more tenants and the one or more sub-tenants include a graphical input, wherein selection of the graphical input causes a subsequent graphical object associated with an additional sub-tenant to be added thereto in the two or more hierarchical structures.

21. The computer-readable medium of claim 15, wherein the first permission command is directed to the asset template.

* * * * *